Sept. 11, 1962 H. J. HEIJN ET AL 3,053,994

CIRCUIT ARRANGEMENT FOR CONVERTING INPUT PULSES INTO OUTPUT PULSES OF SUBSTANTIALLY INVARIABLE WIDTH AND AMPLITUDE

Filed Jan. 30, 1958

INVENTORS
HERMAN JACOB HEIJN
JOHANNES ARNOLDUS SAMWEL
THEODORUS JOANNES TULP
BY Frank R. Jifari
AGENT 3,053,994

CIRCUIT ARRANGEMENT FOR CONVERTING INPUT PULSES INTO OUTPUT PULSES OF SUBSTANTIALLY INVARIABLE WIDTH AND AMPLITUDE

Herman Jacob Heijn, Johannes Arnoldus Samwel, and Theodorus Joannes Tulp, all of Eindhoven, Netherlands, assignors to North American Philips Company, Inc., New York, N.Y., a corporation of Delaware Filed Jan. 30, 1958, Ser. No. 712,211
Claims priority, application Netherlands Feb. 1, 1957
3 Claims. (Cl. 307—88.5)

The invention relates to a circuit arrangement for converting a sequence of input pulses having an energy content exceeding a given value, which pulses may be produced, for example, by the change-over of memory storage cores, into a corresponding or complementary sequence of output pulses of substantially invariable width and amplitude.

Many forms of such "pulse producers" are known, which usually have an input threshold and an output limitation or which employ regenerative feed-back, for example arrangements comprising a normally cut-off blocking oscillator or a controlled bistable or monostable trigger.

The invention has for its object to provide a particularly simple pulse-producer arrangement employing, in a suitable manner, the phenomenon of the storage of free charge carriers in the base zone of a junction transistor, which phenomenon is described in the prior applications Serial Nos. 625,726 and 625,727, both filed Dec. 3, 1956. In this arrangement the input pulses are supplied between the base electrode and the emitter electrode of the junction transistor, the collector of which is fed with test pulses such that each input pulse starts before a corresponding test pulse and also terminates before this pulse, whereas the output pulses starting with corresponding test pulses are obtained from the collector circuit of the transistor.

It is known that the time T during which the number of stored free charge-carriers produced by an input pulse subsists in the base zone of a transistor is related to the diffusion time constant $T_d$ of the minority carriers in the base zone; this time constant, in turn, has a definite relationship with the cut-off angular frequency $2\pi f$ of the current amplification factor of the transistor employed. In an arrangement with a grounded emitter, for instance, the time T is of the same order as the reciprocal value of the cut-off angular frequency of the base-collector current amplification factor $\alpha'$ of the transistor used.

In order to produce output pulses with an invariable amplitude, the test pulses applied to the collector must at any rate be shorter than the time constant T of the transistor in the arrangement employed. Since the input pulses may be much shorter or, as the case may be, longer than the test pulses, this means that the test pulses must be shorter than the said time constant.

Accordingly the circuit arrangement according to the invention is characterized in that use is made of a transistor having a current amplification factor, of which the cut-off angular frequency is lower than the reciprocal value of the width of the test pulses and in that a separation rectifier having the same pass direction as the emitter-base diode of the transistor is included in series in the input circuit. Under these conditions and owing to the storage of free charge carriers produced by each input pulse in the base zone of the transistor, each output pulse terminates simultaneously with the corresponding test pulse.

This arrangement permits the attainment of a satisfactory discrimination with respect to the energy content of the input pulses. If an interference pulse of inverse polarity or of lower energy content is supplied between the base electrode and the emitter electrode of the transistor, the base zone is not provided with its charge of stored free charge carriers or at least not with its full charge and the corresponding output pulse is strongly attenuated and/or shortened and practically completely suppressed with adequate delay of the test pulse with respect to the input pulse.

The circuit arrangement according to the invention is particularly suitable for reading out the information in at least one magnetic memory core with the aid of a read-out current pulse through a winding of the memory core, this pulse producing, across a second winding of the memory core, an input pulse with an energy content dependent on the magnetic condition of the core. For this application the second winding of the core is coupled with the rectifier and with the base-emitter circuit of the transistor, preferably via a transformer, by means of which the read-out pulse source is matched to the input circuit at the change-over of the core from one saturation condition into the other. When the core is saturated, this source is, however, comparatively loosely coupled with the input circuit, so that there is a material reduction in the amplitude of input pulses produced by read-out pulses which do not change over the core from one saturation condition into the other. In other terms, when reading-out memory storage cores, a still better discrimination with respect to interference pulses produced systematically or not can be achieved by means of the matching transformer.

The invention will be described more fully with reference to the drawing, in which.

Figure 1:
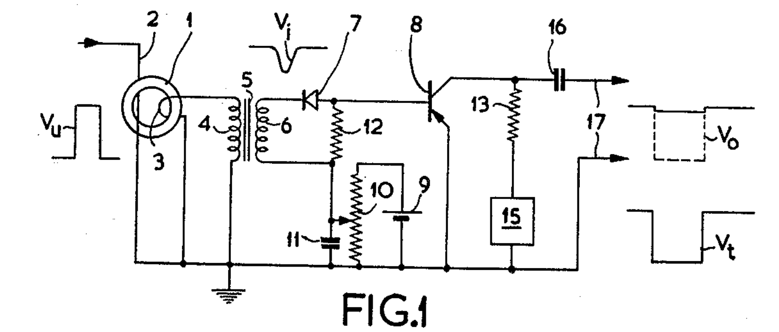
FIG. 1 shows diagrammatically a first embodiment of the circuit arrangement according to the invention.

The embodiment shown in FIG. 1 is intended for reading-out the information in at least one magnetic memory storage core. FIG. 1 shows a magnetic core 1, in which information can be recorded in the form of a particular magnetic condition by means of a winding (not shown). In order to read-out and to erase this information, a winding 2 is coupled to the magnetic core. Through this winding is passed a so-called read-out pulse, for example a positive pulse of adequate amplitude to change over the memory core 1 from a given magnetic saturation condition into the opposite magnetic saturation condition (see the pulse $V_u$ shown at the left-hand side of FIG. 1).

The core 1 is provided with a second winding 3, which is connected to the primary winding 4 of a transformer 5. The secondary winding 6 of this transformer is connected on the one hand via a rectifier 7 to the base electrode of a p-n-p transistor 8 and on the other hand via a threshold voltage source to the emitter electrode of this transistor. The threshold voltage source comprises a battery 9, the negative terminal of which is directly connected to the emitter electrode and to earth, whereas the positive terminal is connected to the ungrounded terminal of a variable voltage divider 10. The other terminal of this voltage divider is connected to earth and its tapping is connected to the secondary winding 6 of the transformer 5 and decoupled by means of a capacitor 11. The input circuit of the arrangement also includes a very high leakage resistor 12, which is connected between the base of the transistor 8 and the tapping of the voltage divider 10. The pass direction of the series-connected emitter-base diode of the transistor 8 is the same as that of the diode 7 and the base of the transistor 8 is biased in the reverse direction by the threshold voltage source 9, 10. If a leakage current passes through the base-emitter- and/or collector-electrode path of the transistor 8, the diode 7 is also biased in the reverse direction by the voltage drop across the leakage resistor 12. The collector circuit of the transistor 8 includes a load resistor 13 in series with a test-pulse source 15. The output terminals 17 of the arrangement are respectively connected to the collector electrode of the transistor 8 via a separation capacitor 16 and directly to earth.

The read-out-pulse source and the test-pulse source are synchronized in a manner such that each input or read-out-pulse starts and terminates before a corresponding test pulse. Output pulses starting with corresponding test pulses are obtained from the terminals 17.

Figure 2:
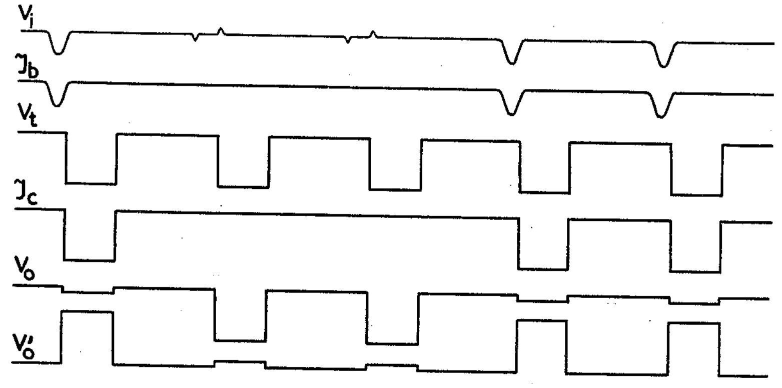
FIG. 2 shows a time diagram to illustrate the operation of the embodiments of FIGS. 1 and 3.

In accordance with the magnetization direction of the memory core, this core is either further saturated by a read-out-pulse through the winding 2, the core returning to its initial condition at the termination of the read-out-pulse or, conversely, it is inversely magnetized and brought into the opposite magnetic saturation condition. In the first case only very small flux variations occur, so that only a pair of very small voltage pulses of opposite polarities is produced across the winding 3. In the second case the variation in the flux through the magnetic memory storage core is substantially equal to twice the saturation flux, so that a single voltage pulse of much larger amplitude is produced across the winding 3. This current pulse passes through the primary winding 4 of the transformer 5. It is transferred, slightly sharpened, by this transformer, so that a pair of input pulses $V_i$ of the shape shown on the top line of FIG. 2 occurs at the terminals of the secondary winding 6 due to a pair of read-out pulses causing inverse magnetization of the core. This line shows on the left-hand side a large change-over magnetizing pulse, which is followed by two pairs of small interference-pulses produced by read-out pulses, by which the core is not inversely magnetized, and the line terminates with two further large change-over magnetizing pulses. Consequently, a large pulse provides the information that the memory core is in such a magnetic condition that it becomes inversely magnetized by the read-out pulse, whilst the absence of a large pulse corresponds to the situation that the memory core is in such a magnetic condition that it is not inversely magnetized by the read-out pulse. During the changeover of its magnetization condition, the core temporarily exhibits a high permeability, so that the read-out winding 2 is tightly coupled with the second winding 3. If, on the other hand, the memory core is not inversely magnetized, the coupling between the winding 2 and the winding 3 is very loose, since the permeability of the core remains very small during the read-out pulse. The ratio between the respective numbers of turns of the windings 4 and 6 of the transformer 5 is chosen to be such that, when the memory core is brought from one saturation condition into the other by a read-out pulse, the read-out pulse source is matched to the input circuit including the series connection of the emitter-base electrode path of the transistor 8, the diode 7 and the threshold-voltage source 9, 10 and furthermore the leakage resistor 12. If the memory core is not inversely magnetized by a read-out pulse, the internal impedance of the read-out pulse source seen across the terminals of the winding 4 is comparatively high. Consequently, the weak interference pulses transferred by the transformer 5 are strongly reduced, so that they lie below the threshold of the threshold-voltage source 9, 10. On the second line of FIG. 2 are indicated the current pulses $I_b$ through the base circuit of the transistor 8. It is evident that only the comparatively large input pulses $V_i$ through the secondary winding 6 of the transformer 5 produce current pulses $I_b$. The third line shows the regular negative test pulses $V_t$, produced by the test-pulse source 15. As stated above, each read-out pulse $V_u$ starts before a corresponding test pulse $V_t$ and also terminates before this pulse. The output pulses at the collector of the transistor 8 are indicated on the fifth line of FIG. 2. In the presence of an input pulse $V_i$, the corresponding output pulse $V_o$ has only a very small amplitude, whereas in the absence of such an input pulse and, as the case may be, in the presence of a small interference pulse, a large negative output pulse is produced: consequently, the sequence of output pulses is complementary to the sequence of input pulses. The fourth line of FIG. 2 shows the current pulses through the collector circuit including the resistor 13 and the test-pulse source 15. It is evident that the sequence of current pulses $I_c$ is not complementary to the sequence of input pulses, but that it corresponds therewith. The small output pulses $V_o$, which are produced in the presence of an input pulse $V_i$, are due to the fact that even if the collector-emitter circuit of the transistor 8 is rendered conductive by an input pulse, it still has a small impedance across which a voltage drop occurs.

The input current pulses $I_b$, applied to the base of the transistor 8, are only short, negative peaks and it is desirable to obtain output pulses of constant width. To this end use is made of the storage of free charge carriers in the base zone of the transistor produced by each input pulse of adequate energy content. The diode 7 is provided to prevent this charge from leaking away across the low-ohmic secondary winding of the transformer 5. However, after a comparatively long time, this charge can leak away via the resistor 12 and part of the potentiometer 10 and is normally sucked off by the collector current pulse produced. For particular purposes, for example if the application of a test pulse to the collector of the transistor 8 is correlated to a given function, it is desirable to proportion the resistor 12 so that the charge produced in the base zone of the transistor 8 by an input pulse has substantially completely leaked away before the beginning of any test pulse via this resistor following the corresponding test pulse: if this condition is not fulfilled, an input pulse is capable, even in the absence of a corresponding test pulse, of producing an output pulse during the time allotted to a subsequent test pulse and of simulating therefore the presence of a subsequent input pulse, which may not actually be present. The stored quantity of free charge carriers must, however, be as large as possible in order to obtain a very effective control of the transistor and to produce current pulses $I_c$ with a substantially flat top limited by collector current saturation. This is achieved by using a transistor 8 having a current amplification factor, of which the cut-off angular frequency is smaller than the reciprocal value of the width of the test pulse $V_t$. In other terms the transistor 8 is a transistor with a comparatively low cut-off frequency of its base-collector current amplification factor $\alpha'$. Such a transistor is not capable of reproducing the short input current pulses $I_b$ without distortion. Each of these input pulses produces a storage of free charge carriers in the base zone of this transistor, so that it operates as a short-time memory until the charge in its base zone is sucked off by an output current pulse or until it has leaked away. This sucking-off occurs shortly after the arrival of each input pulse, with the aid of a test pulse which biases the collector in the reverse direction. This has the consequence, that each output current pulse terminates simultaneously with the corresponding test pulse, so that a complementary series of output pulses with substantially invariable width and amplitude is obtained at the output terminals 17.

Figures 3, 4:
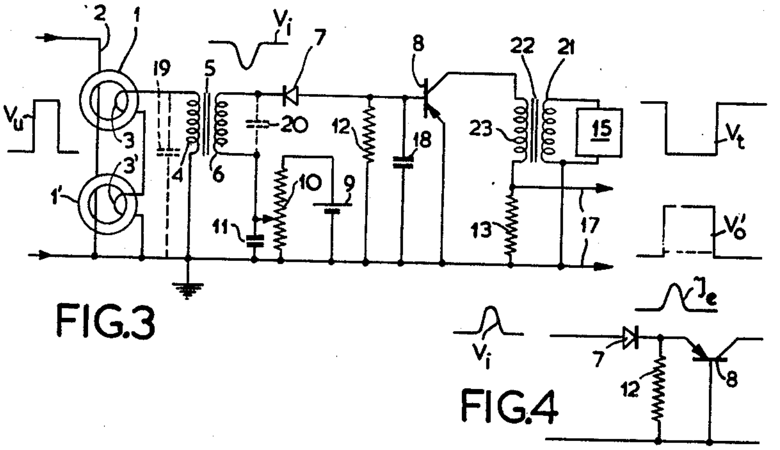
FIG. 3 shows diagrammatically a second embodiment of the arrangement according to the invention.
FIG. 4 shows a modification of the embodiments shown in FIGS. 1 and 3.

The second embodiment shown in FIG. 3 is an "and" circuit arrangement. The read-out winding 2 is passed through two memory cores 1 and 1', of which the second windings 3 and 3' respectively are connected in series with one another. Instead of the base of the transistor 8, the threshold-voltage source 9, 10 biases the diode 7 and a capacitor 18 is connected between the base electrode and the emitter electrode of the transistor. This capacitor acts as a substitute for a larger base capacity of the transistor 8, so that the memory effect is prolonged. The biasing of the diode 7 by means of a threshold voltage instead of a biasing of the base-emitter circuit of the transistor 8 does not produce a great difference in the operation of the arrangement. In this embodiment also the base-emitter path of the transistor 8 is biased in the reverse direction at the occurrence of any leakage current through the diode 7 by the voltage drop across the resistor 12. In order to obtain a still better discrimination with respect to any sharp, short interference pulses with a comparatively small energy content, capacitors 19 and 20 respectively may be connected in parallel with the primary winding 4 of the transformer 5 and/or with the secondary winding 6 of this transformer. In this second embodiment the collector circuit of the transistor 8 includes also a load resistor 13 in series with the secondary winding 23 of a test-pulse transformer 22, of which the primary winding 21 is connected to the test-pulse source 15. The resistor 13 is connected to earth, so that the output voltage pulses $V'_o$ produced across it (see sixth line of FIG. 2) correspond to the current pulses $I_b$. Thus a sequence of output pulses corresponding to the sequence of input pulses, is obtained, their width and amplitude being substantially invariable.

A modification of the arrangements shown in FIGS. 1 and 3 is shown in FIG. 4. In this modification, the transistor 8 is connected in grounded base arrangement and the input pulses are supplied via the diode 7 to its emitter electrode. The forward direction of the diode 7 and the polarity of the input pulses $V'_i$ and $I_e$ are reversed with respect to $V_i$ and $I_b$. Moreover, the threshold-voltage source 9, 10 is omitted.

With this arrangement, the storage of free charge carriers in the base zone is materially less operative, since the time T during which the storage of free charge carriers produced by an input pulse is maintained is in this case of the same order of magnitude as the reciprocal value of the cut-off angular frequency of the emitter-collector current amplification factor $\alpha$ of the transistor employed. With a junction transistor this cut-off frequency is much higher than the cut-off angular frequency of the base-collector current amplification factor $\alpha'$, so that the modification shown in FIG. 4 is only suitable for comparatively short input pulses and can be used only for producing comparatively short output pulses. Moreover, it is materially less sensitive than the arrangement with grounded emitter electrode; it may, however, be controlled by very short input pulses and may, under certain conditions, be more suitable than the arrangement with grounded emitter, for example in computers with a very high operational frequency or in the case of a very high repetition frequency of the test pulses.

What is claimed is:

1. A circuit arrangement for converting a sequence of input pulses having an energy content exceeding a given value into a corresponding sequence of output pulses of substantially invariable width and amplitude comprising a transistor having a base electrode, an emitter electrode and a collector electrode, a separation rectifier included in series in the base-emitter input circuit of said transistor, said rectifier having the same pass direction as the emitter-base diode of the transistor, means for applying said sequence of input pulses between the base and the emitter electrodes, means for applying a series of test pulses to the collector electrode, the time relationship between said input and test pulses being such that each input pulse starts and terminates before a corresponding test pulse, said transistor having a current amplification factor the cut-off angular frequency of which is smaller than the reciprocal value of the width of the test pulses, and deriving means connected across the collector-emitter path of said transistor for deriving said sequence of output pulses, the output of said transistor from said deriving means comprising a series of output pulses each of which starts at the same time as a corresponding test pulse, each output pulse terminating simultaneously with the corresponding test pulse, due to the storage of free charge carriers produced in the base zone of the transistor by each input pulse, said means for applying the sequence of input pulses comprising a magnetic memory storage core having a read-out winding and an output winding, the pulses derived from said output winding being dependent on the magnetic condition of said core and comprising said sequence of input pulses, said output winding being coupled to an input circuit comprising said rectifier and the base-emitter circuit of said transistor through a transformer which matches the impedance of the input circuit to the impedance of the output winding of the core at the change-over of the core from one saturation condition to an opposite saturation condition and loosely couples the output winding of the core to the input circuit when the core is saturated, said transformer thereby effecting a material reduction in the amplitude of the input pulses produced by read-out pulses which do not change over the core from one saturation condition into an opposite saturation condition.

2. A circuit arrangement for converting a sequence of input pulses having an energy content exceeding a given value into a corresponding sequence of output pulses of substantially invariable width and amplitude comprising a transistor having a base electrode, an emitter electrode and a collector electrode, a separation rectifier included in series in the base-emitter input circuit of said transistor, said rectifier having the same pass direction as the emitter-base diode of the transistor, means for applying said sequence of input pulses between the base and the emitter electrodes, means for applying a series of test pulses to the collector electrode, the time relationship between said input and test pulses being such that each input pulse starts and terminates before a corresponding test pulse, said transistor having a current amplification factor the cut-off angular frequency of which is smaller than the reciprocal value of the width of the test pulses, and deriving means connected across the collector-emitter path of said transistor for deriving said sequence of output pulses, the output of said transistor from said deriving means comprising a series of output pulses each of which starts at the same time as a corresponding test pulse, each output pulse terminating simultaneously with the corresponding test pulse, due to the storage of free charge carriers produced in the base zone of the transistor by each input pulse, said base and emitter electrodes being interconnected through a leakage resistor, said resistor having a value such that the stored free charge carriers produced in the base zone of the transistor by the input pulses substantially completely leak away before the start of the following test pulse, said means for applying the sequence of input pulses comprising a magnetic memory storage core having a read-out winding and an output winding, the pulses derived from said output winding being dependent on the magnetic condition of said core and comprising said sequence of input pulses, said output winding being coupled to an input circuit comprising said rectifier and the base-emitter circuit of said transistor through a transformer which matches the impedance of the input circuit to the impedance of the output winding of the core at the change-over of the core from one saturation condition to an opposite saturation condition and loosely couples the output winding of the core to the input circuit when the core is saturated, said transformer thereby effecting a material reduction in the amplitude of the input pulses produced by read-out pulses which do not change over the core from one saturation condition into an opposite saturation condition.

3. A circuit arrangement for converting a sequence of input pulses having an energy content exceeding a given value into a corresponding sequence of output pulses of substantially invariable width and amplitude comprising a transistor having a base electrode, an emitter electrode and a collector electrode, a separation rectifier included in series in the base-emitter input circuit of said transistor, said rectifier having the same pass direction as the emitter-base diode of the transistor, means for applying said sequence of input pulses between the base and the emitter electrodes, means for applying a series of test pulses to the collector electrode, the time relationship between said input and test pulses being such that each input pulse starts and terminates before a corresponding test pulse, said transistor having a current amplification factor the cut-off angular frequency of which is smaller than the reciprocal value of the width of the test pulses, and deriving means connected across the collector-emitter path of said transistor for deriving said sequence of output pulses, the output of said transistor from said deriving means comprising a series of output pulses each of which starts at the same time as a corresponding test pulse, each output pulse terminating simultaneously with the corresponding test pulse, due to the storage of free charge carriers produced in the base zone of the transistor by each input pulse, said base and emitter electrodes being interconnected through a leakage resistor, said resistor having a value such that the stored free charge carriers produced in the base zone of the transistor by the input pulses substantially completely leak away before the start of the following test pulse, said means for applying the sequence of input pulses comprising a magnetic memory storage core having a read-out winding and an output winding, the pulses derived from said output winding being dependent on the magnetic condition of said core and comprising said sequence of input pulses, said output winding being coupled to an input circuit comprising said rectifier and the base-emitter circuit of said transistor through a transformer which matches the impedance of the input circuit to the impedance of the output winding of the core at the change-over of the core from one saturation condition to an opposite saturation condition and loosely couples the output winding of the core to the input circuit when the core is saturated, said transformer thereby effecting a material reduction in the amplitude of the input pulses produced by read-out pulses which do not change over the core from one saturation condition into an opposite saturation condition, the emitter-base diode of said transistor being biased in the reverse direction by a threshold-voltage source, said arrangement being thus rendered insensitive to input pulses having an amplitude lower than the threshold voltage.

References Cited in the file of this patent

UNITED STATES PATENTS

| | | |
|---|---|---|
| 2,644,893 | Gehman | July 7, 1953 |
| 2,809,303 | Collins | Oct. 8, 1957 |
| 2,850,236 | Schaefer et al. | Sept. 2, 1958 |
| 2,866,105 | Eckert | Dec. 23, 1958 |
| 2,889,467 | Endres et al. | June 2, 1959 |
| 2,899,571 | Myers | Aug. 11, 1959 |
| 2,904,678 | Malchow | Sept. 15, 1959 |
| 2,905,815 | Goodrich | Sept. 22, 1959 |